US008080625B2

(12) United States Patent
Herzig et al.

(10) Patent No.: US 8,080,625 B2

(45) Date of Patent: Dec. 20, 2011

(54) ORGANOPOLYSILOXANES CONTAINING QUATERNARY AMMONIUM GROUPS, THE PRODUCTION AND USE THEREOF

(75) Inventors: Christian Herzig, Waging (DE); Siegfried Dormeier, Stubenberg (DE); Anton Heller, Simbach (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/743,949

(22) PCT Filed: Nov. 11, 2008

(86) PCT No.: PCT/EP2008/065328

§ 371 (c)(1), (2), (4) Date: May 20, 2010

(87) PCT Pub. No.: WO2009/068435

PCT Pub. Date: Jun. 4, 2009

(65) Prior Publication Data

US 2010/0243944 A1 Sep. 30, 2010

(30) Foreign Application Priority Data

Nov. 26, 2007 (DE) ......................... 10 2007 047 863

(51) Int. Cl.

*C08G 77/14* (2006.01)
*C08G 77/26* (2006.01)
*C08G 77/32* (2006.01)
*C08G 77/388* (2006.01)

(52) U.S. Cl. ............................. 528/28; 528/27; 525/474

(58) Field of Classification Search .................. 525/477; 528/28

See application file for complete search history.

(56) References Cited

U.S. PATENT DOCUMENTS

| | | | | |
|---|---|---|---|---|
| 3,389,160 | A | 6/1968 | Reid | |
| 4,895,964 | A | 1/1990 | Margida | |
| 5,025,076 | A * | 6/1991 | Tanaka et al. | 528/33 |
| 6,833,344 | B2 * | 12/2004 | Boutique et al. | 510/330 |
| 2003/0045666 | A1 | 3/2003 | Schattenmann | |
| 2004/0219371 | A1 * | 11/2004 | Will et al. | 428/447 |

FOREIGN PATENT DOCUMENTS

| | | | |
|---|---|---|---|
| DE | 1493384 | B | 3/1971 |
| DE | 102005012410 | A1 | 9/2005 |
| EP | 1288246 | A1 | 3/2003 |
| EP | 1561770 | A1 | 8/2005 |

* cited by examiner

*Primary Examiner* — Randy Gulakowski
*Assistant Examiner* — Mike M Dollinger
(74) *Attorney, Agent, or Firm* — Brooks Kushman P.C.

(57) ABSTRACT

Polysiloxanes containing both epoxy groups and quaternary ammonium groups bonded to the polysiloxane through ring-opened epoxy groups provide a soft hand and wash fastness to fibrous substrates.

17 Claims, No Drawings

ORGANOPOLYSILOXANES CONTAINING QUATERNARY AMMONIUM GROUPS, THE PRODUCTION AND USE THEREOF

CROSS-REFERENCE TO RELATED APPLICATION

This application is the U.S. national phase of PCT Appln. No. PCT/EP2008/065328 filed Nov. 11, 2008 which claims priority to German application DE 10 2007 047 863.3 filed Nov. 26, 2007.

BACKGROUND OF THE INVENTION

1. Field of the Invention

The invention relates to organopolysiloxanes comprising quaternary ammonium groups and the preparation and use of the organopolysiloxanes.

2. Description of the Related Art

U.S. Pat. No. 3,389,160 (corresponding to DE 1 493 384 B) describes quaternary ammonium pendant siloxanes which can be prepared by reacting appropriate epoxyalkylsiloxanes with secondary amines and subsequent quaternization of the resulting tertiary amine groups with alkylating agents such as methyl chloride.

U.S. Pat. No. 4,895,964 describes a further development of the process described in U.S. Pat. No. 3,389,160 wherein, instead of the secondary amine, a salt of a tertiary amine is used for reacting the epoxysiloxane and, in addition, a catalytic amount of a free tertiary amine is added, this catalytic amount having a ratio of from 0.0005:1 to 0.05:1 for free tertiary amine equivalent to tertiary ammonium salt equivalent. The production process accordingly requires the use of two reagents: tertiary ammonium salt and free amine. If, for reasons of better dispersibility, the ammonium salt were prepared in situ, by adding the amine before the acid, the required low concentrations of free amine necessitate very accurate control over the amount of acid added, which is scarcely achievable in industrial practice.

Branched organopolysiloxanes having quaternary ammonium groups are disclosed in EP 1 561 770 A. The branched quat siloxanes are obtained by combining siloxanes having lateral epoxy groups and α,ω-epoxysiloxanes with tertiary mono-and diamines. This complicated multicomponent technology requires very precise fine-tuning of the reactant quantities and is not very tolerant with regard to the quality of the lateral epoxysiloxane as far as the number and concentration of its epoxy groups are concerned. The products are free of epoxy groups, since the organic radical E in question is defined in paragraph [0038] of EP 1 561 770 A such that it bears exactly one quaternary nitrogen atom.

SUMMARY OF THE INVENTION

The invention has for its object to provide organopolysiloxanes comprising quaternary ammonium groups useful for endowing fibrous substrates, such as natural or artificial substrates having a fibrous structure, more particularly textile sheet materials, with a both soft and hydrophilic finish.

This invention further has for its object to provide a process for treating, more particularly coating or impregnating, fibrous substrates, more particularly textile sheet materials, wherein the treatment also achieves good durability for the finish, such as soft hand and hydrophilicity. These and other objects are achieved by this invention, which provides organopolysiloxanes containing both quaternary ammonium groups and epoxy groups.

DETAILED DESCRIPTION OF THE PREFERRED EMBODIMENTS

The invention accordingly provides organopolysiloxanes comprising quaternary ammonium groups and comprising units of the general formula $$QR_aSiO_{(3-a)/2} \quad \text{(I)},$$

$$ER_bSiO_{(3-b)/2} \quad \text{(II) and}$$

$$R_cSiO_{(4-c)/2} \quad \text{(III)},$$

where

R is identical or different and represents a monovalent, optionally halogenated hydrocarbyl radical having 1 to 18 carbon atoms, E represents a monovalent SiC-bonded organic radical having 3 to 18 carbon atoms which comprises an epoxy group, Q represents a monovalent SiC-bonded organic radical in which a quaternary ammonium group is bonded to a silicon atom via a ring-opened epoxy group, a is 0, 1 or 2, b is 0, 1 or 2, and c is 0, 1, 2 or 3, with the proviso that the siloxanes (1) comprise at least one unit of formula (I) and (II) and the Q/E ratio is on average in the range from 0.2 to 100, preferably in the range from 0.5 to 20 and more preferably in the range from 1 to 10.

The invention further provides a process for preparing the organopolysiloxanes comprising quaternary ammonium groups by reacting epoxy-containing organopolysiloxanes (1) comprising units of the formulae (II) and (III)

$$ER_bSiO_{(3-b)/2} \quad \text{(II) and}$$

$$R_cSiO_{(4-c)/2} \quad \text{(III)},$$

where R, E, b and c are each as defined above, with tertiary amines (2) comprising at least one structural unit of the general formula $$R^1_2N— \quad \text{(IV)}$$

where $R^1$ represents an alkyl radical having 1 to 6 carbon atoms, with the proviso that the sum total of all structural units of formula (IV) is less than the sum total of all units of formula (II) and that the molar amount of the acids (3) which are used for neutralizing the reaction mixture is not less than the molar amount of basic structural units (IV) of said amines (2).

The organopolysiloxanes of this invention may comprise linear, branched, cyclic or else resinous structures featuring a multiplicity of tri- or/and tetrafunctional siloxane units. The organopolysiloxanes preferably comprise three or more and more preferably ten or more siloxane units per molecule.

Preferred organopolysiloxanes comprising quaternary ammonium groups are those of the general formula $$A_dR_{3-d}SiO(SiR_2O)_o(SiRAO)_pSiR_{3-d}A_d \quad \text{(V)}$$

where A represents a radical E or Q provided the Q/E ratio is on average in the range from 0.2 to 100, d is 0 or 1, preferably 0, o is 0 or an integer from 1 to 3000, preferably from 10 to 1000, and p is an integer from 2 to 100, preferably from 2 to 20.

The viscosity of the organopolysiloxanes of the invention is preferably in the range from 50 to 500,000 mPa.s (25° C.) and more preferably in the range from 200 to 50,000 mPa.s (25° C.).

Examples of R radicals are alkyl radicals such as methyl, ethyl, n-propyl, isopropyl, 1-n-butyl, 2-n-butyl, isobutyl, tert-butyl, n-pentyl, isopentyl, neopentyl, and tert-pentyl, hexyl such as n-hexyl, heptyl such as n-heptyl, octyl such as n-octyl and isooctyl such as 2,2,4-trimethylpentyl, nonyl such as n-nonyl, decyl such as n-decyl, dodecyl such as n-dodecyl, and octadecyl such as n-octadecyl; cycloalkyl radicals such as cyclopentyl, cyclohexyl, cycloheptyl and methylcyclohexyl; alkenyl radicals such as vinyl, 5-hexenyl, cyclohexenyl, 1-propenyl, allyl, 3-butenyl and 4-pentenyl; alkynyl radicals such as ethynyl, propargyl and 1-propynyl; aryl radicals such as phenyl, naphthyl, anthryl and phenanthryl; alkaryl radicals such as o-, m-, p-tolyl, xylyl and ethylphenyl; and aralkyl radicals such as benzyl, α-phenylethyl and β-phenylethyl.

Examples of R halo radicals are haloalkyl radicals such as 3,3,3-trifluoro-n-propyl, 2,2,2,2',2',2'-hexafluoroisopropyl and heptafluoroisopropyl, and haloaryl radicals such as o-chlorophenyl, m-chlorophenyl and p-chlorophenyl.

Examples of $R^1$ alkyl radicals are methyl, ethyl, n-propyl, isopropyl, 1-n-butyl, 2-n-butyl, isobutyl, tert-butyl, n-pentyl, isopentyl, neopentyl, tert-pentyl, and hexyl such as n-hexyl, of which methyl and ethyl are preferred and methyl is particularly preferred.

The E radicals are preferably those of the formula (VI)

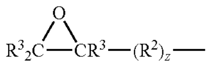

or (VII)

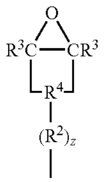

where $R^2$ is a divalent hydrocarbyl radical having 1 to 10 carbon atoms per radical, which may be interrupted by an ether oxygen atom, $R^3$ is a hydrogen atom or a monovalent hydrocarbyl radical having 1 to 10 carbon atoms per radical, which may be interrupted by an ether oxygen atom, $R^4$ is a trivalent hydrocarbyl radical having 3 to 12 carbon atoms per radical, and z is 0 or 1.

Examples of E radicals are
glycidoxypropyl,
3,4-epoxycyclohexylethyl,
2-(3,4-epoxy-4-methylcyclohexyl)-2-methylethyl,
3,4-epoxybutyl,
5,6-epoxyhexyl,
7,8-epoxydecyl,
11,12-epoxydodecyl and
13,14-epoxytetradecyl.

The process of this invention preferably utilizes organopolysiloxanes (1) of the general formula $$E_dR_{3-d}SiO(SiR_2O)_o(SiREO)_pSiR_{3-d}E_d \quad \text{(VIII)}$$

where E, d, o and p are each as defined above.

The tertiary amines (2), which are made to react with the epoxysiloxanes (1), preferably comprise 1 to 3 structural units of the general formula (IV) and more preferably comprise 1 or 2 such structural units. It is in the nature of the reaction of tertiary amines (2) with epoxysiloxanes (1) in the presence of acids (3) that the amino groups of formula (IV) are all converted into quaternary ammonium groups. Therefore, the molar amount of the quaternary nitrogen atoms in the sum total of the Q radicals after the reaction corresponds to the molar amount of the $R^1_2N$— structural units used.

Examples of structural units of the general formula (IV) are dimethylamino, diethylamino, ethylmethylamino, dipropylamino and butylmethylamino, of which dimethylamino and diethylamino are preferred and dimethylamino is particularly preferred.

Preference is given to using tertiary amines (2) of the general formula $$R^1_2N—B$$

where

B represents an $R^5$ radical or a radical of the formula —[Z—$NR^1$]$_s$—Z—$NR^1_2$, where $R^5$ represents an alkyl radical having 1 to 18 carbon atoms, which may be substituted by a carbinol radical, amide radical, hydroxyalkylamide radical, hydroxyalkylamine radical or acid radical, Z represents a divalent hydrocarbyl radical having 1 to 18 carbon atoms, which may be interrupted by an ether oxygen atom, s is 0 or an integer from 1 to 6 and preferably is 0, 1 or 2.

Examples of tertiary amines (2) are therefore dimethylethylamine, dimethylpropylamine, dimethylbutyl-amine, dimethylhexylamine, dimethyloctylamine, dimethyldecylamine, dimethyldodecylamine, dimethyltetradecylamine, dimethylhexadecylamine, dimethyloctadecylamine, dimethylbenzylamine, dimethylaniline, dimethylcocoamine, dimethylmyristylamine, dimethylstearylamine, ethylmethyloctylamine, diethyldodecylamine, diethylstearylamine, dimethylaminopropylacetamide, dimethylaminopropylcocoamide, dimethylaminopropylstearylamide, dimethylethanolamine, and also higher functional tertiary amines, such as tetramethylpropylenediamine, tetramethylhexamethylenediamine, bis(2-dimethylaminoethyl)ether, pentamethyldiethylenetriamine, pentamethyldipropylenetriamine, tris(2-dimethylaminoethyl)amine and tris(2-dimethylaminopropyl)amine.

By way of acids (3) it is possible to use organic or inorganic acids HX.

Examples of acids (3) are formic acid, acetic acid, propionic acid, 2-ethylhexanoic acid, lauric acid, palmitic acid, stearic acid, benzoic acid, methanesulfonic acid, toluenesulfonic acid, sulfuric acid, hydrochloric acid, hydrobromic acid, ethanephosphonic acid, and phosphoric acid.

The amounts in which tertiary amines (2) are used in the process of this invention preferably range from 0.15 to 0.99 mol, and more preferably from 0.3 to 0.9 mol of structural unit (IV) per mole of epoxy group in the organopolysiloxanes (1).

The process of this invention is prepared in the presence of organic or inorganic acids HX. These acids HX are used in amounts of preferably 1 to 2 mol, more preferably 1 to 1.5 mol, all based on 1 mol of basic structural units (IV) in the tertiary amines (2).

Examples of Q radicals are (IX)

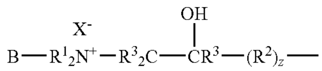

or

-continued (X)

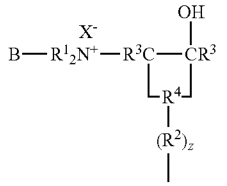

where $X^-$ is the counter ion to the positive charge on the quaternized nitrogen group selected from anions of organic or inorganic acids HX and $R^1$, $R^2$, $R^3$, $R^4$, B and z are each as defined above.

The concentrations of quaternary nitrogen in the organopolysiloxanes of this invention preferably lie in the range from 0.02 to about 1.0 mEquiv./g, more preferably 0.05 to 0.50 mEquiv./g and most preferably 0.10 to 0.30 mEquiv./g. Correspondingly, the concentrations of epoxy groups in the organopolysiloxanes of this invention preferably range from 0.005 to about 1.0 mEquiv./g, more preferably from 0.02 to about 0.5 mEquiv./g and most preferably from 0.04 to about 0.3 mEquiv./g.

The organopolysiloxanes of this invention can be used in a self-dispersing aqueous formation provided the concentration of quaternary nitrogen is sufficient (typically above 0.2 mEquiv./g). For easier handling, it is advisable for this to admix with diluents, such as alcohols, diols and/or alkoxylates thereof.

Alternatively, specifically when the concentration of quaternary nitrogen is low (<0.2 mEquiv./g), the emulsification to aqueous formulations by means of commercially available emulsifiers is preferable.

The aqueous solutions or emulsions preferably comprise from 10% to 60% and more preferably from 20% to 50% by weight of the organopolysiloxanes of this invention.

This invention provides formulations comprising (A) polyamino compounds comprising two or more amino groups, and (B) organopolysiloxanes comprising quaternary ammonium groups according to the invention.

The compounds (A) and (B) are preferably used in the formulations in the form of aqueous solutions or emulsions.

The treatment of the fibrous substrates, preferably textile sheet materials, is preferably effected using a combination of the compounds (A) and (B), and can be effected in two different processing variants.

Preferably, the fibrous substrates are treated with the formulations of this invention by preparing mixtures of compounds (A) and (B) prior to the treatment.

In a further processing variant wherein the treatment is effected with a combination of compounds (A) and (B), the treatment is effected first with compounds (A) and then subsequently the treatment with compounds (B) is effected.

The term "fibrous substrates" herein shall comprehend all natural or artificial substrates of fibrous structure.

The term "treatment of fibrous substrates" herein shall comprehend the coating or impregnating of fibrous substrates to modify their properties in a desired manner, for example by rendering the fibrous substrates soft and hydrophilic.

Compounds (A) used in the process of this invention can be monomeric, oligomeric or polymeric in character. Compounds (A) are preferably silicon-free organic polyamino compounds. Compounds (A) preferably comprise two or more primary amino groups. Compounds (A) comprise preferably from 5 to 5000 amino groups ($—NH_2$), more preferably from 10 to 1000 amino groups ($—NH_2$) and even more preferably from 20 to 200 amino groups ($—NH_2$). Compounds (A) preferably comprise primary amino groups, but may comprise secondary or tertiary amino groups in addition to primary amino groups.

The concentration of amino groups in compounds (A) is preferably in the range from 1 to 20 mEquiv./g, preferably in the range from 4 to 20 mEquiv./g mEquiv./g=mEquivalent per g of substance=equivalent per kg of substance).

Examples of polyamino compounds (A) are partially or fully hydrolyzed polymers of vinylformamide, linear or branched ethyleneimine polymers and condensation products of diethylenetriamine and homologs with dicarboxylic acids, such as succinic acid, glutaric acid, adipic acid and sebacic acid.

The formulations of this invention and the process for treating organic fibers, preferably textile sheet materials, utilize compounds (A) in amounts of preferably 0.1 to 10 mol of amino group, more preferably 0.3 to 3 mol of amino group, all based on 1 mol of epoxy groups in compounds (B).

The organopolysiloxanes comprising quaternary ammonium groups of the invention can be used for treatment of textile sheet materials, textile fibers and leather, as additives in coatings and paints, as admixtures in cosmetic formulations and as surface-active agents. They have, more particularly, outstanding properties as textile softeners, which are far superior to those of polyglycol-containing silicone softeners with respect to softness and durability to washing.

Owing to their cationogenicity, the organopolysiloxanes comprising quaternary ammonium groups of the invention have very high affinity for substrates such as textiles or paper and combine a comparatively high hydrophilicity for organosilicon compounds with excellent improvement in hand. Compared with the prior art amino-functional, glycol-functional, amido-functional and aminoglycol-functional hand-modifying products, the organopolysiloxanes of the invention are notable for improved affinity, durability to washes and dry-cleaning, stability to shearing forces and pH changes and the preparability of synergistic formulations.

The organopolysiloxanes of the invention can therefore be used, for example, as constituents of emulsions, in solution or solventlessly in the treatment of textile sheet materials, for example wovens, knits or fleeces, for textile fiber and yarn finishing and modification and also for leather and paper treatment. Finishing or modifying with the organopolysiloxanes comprising quaternary ammonium groups of the invention can be used to confer desired properties such as, for example, a soft, supple hand, improved elasticity, antistatic properties, color deepening, coefficients of friction, surface smoothness, luster, crease recovery, color fastnesses, durability to laundering, hydrophilicity, tongue tear strength, reduced tendency to pill, easy care and soil release properties, and also improved wearing comfort. The finishing or modification of textile sheet materials, fibers, yarns, paper and leather with the organopolysiloxanes of this invention can further be used to improve industrial processibility, for example the processing and manufacturing speed, possibilities for correction and also the quality of the materials.

The textile sheet materials, fibers and yarns may have been fabricated from mineral fibers, such as glass fibers or silicate fibers, natural fibers such as for example wool, silk or cotton, manufactured fibers, for example polyester, polypropylene or polyamide fibers, cellulose fibers, copolymeric fibers or metal fibers. Filament fibers or staple fibers composed of the substrates mentioned can likewise be used. It is further possible to use sheet materials composed of fiber blends, for example cotton-polyester, paper and also natural sheet materials, such as leather.

The finish, coating or impregnation can be applied in the knife coating process, dip (squeeze) process, extrusion process, spray flocking or atomizing process, padding, exhaust or dip-whizz process. Similarly, all varieties of roller coatings, such as gravure roll, face roll or application via multiroll systems, and also printing, for example (rotary) screen printing, are possible. Finishing or coating can further be carried out by foam application and subsequent calendering, using a calender including a hotmelt-type calender.

The organopolysiloxanes comprising quaternary ammonium groups of the invention can further be used as additives in coatings and paints. Mixtures of the organopolysiloxanes of this invention to, for example, radiation- or addition-curable varnishes lead to a reduction in the surface roughness and thus to a reduction in the slip resistance of the coating.

The organopolysiloxanes comprising quaternary ammonium groups of the invention can further be used as admixtures in cosmetic formulations, for example as conditioners in hair-washing agents, and also as building protectants.

In addition, the organopolysiloxanes comprising quaternary ammonium groups of the invention constitute surface-active agents and can be used as detergents, surfactants, emulsifiers, defoamers and foam stabilizers.

PREPARATION EXAMPLES

Example 1

254 g of a linear polydimethylsiloxane having a viscosity of 82 mPa.s (25° C.) with glycidoxypropyl end groups in a concentration of 0.49 mEquiv./g are mixed at 25° C. with 6.64 g of bis(2-dimethylaminoethyl) ether and 7.5 g of acetic acid before heating to 80° C. The reaction mixture clarifies after 20 minutes and is cooled down after a further 4 hours. The $^1$H NMR spectrum shows that the tertiary amino groups are quantitatively quaternized. Chain extension to form a poly (quat siloxane) having glycidoxypropyl end groups has caused the viscosity of the siloxane used to increase more than a hundredfold to 20,400 mPa.s (25° C.). The oily polymer obtained comprises quaternary nitrogen in a concentration of 0.31 mEquiv./g and has a quat to epoxy groups ratio of 2.02.

Example 2

200 g of a polysiloxane consisting of glycidoxypropylmethylsiloxy, dimethylsiloxy and trimethylsiloxy units and having a viscosity of 350 $mm^2$/s (25° C.) and an epoxy content of 0.251 mEquiv./g are mixed with 4.24 g of dimethylbutylamine and 3.8 g of acetic acid and heated to 80° C. for 5 hours. Free amine is no longer detectable in the reaction mixture; the viscosity has risen to 2470 $mm^2$/s (25° C.). The silicone oil comprises quaternary nitrogen in a concentration of 0.20 mEquiv./g and has a quat to epoxy groups ratio of 5.2.

Example 3

200 g of the epoxysiloxane from example 2, having an epoxy content of 0.251 mEquiv./g, are mixed with 1.52 g of dimethylbutylamine, 1.60 g of bis(2-dimethylaminoethyl) ether and 3.2 g of acetic acid and heated to 80° C. The mixture clarifies after 30 minutes and is then maintained at the same temperature for a further 3 hours, and free amine is no longer detectable. This gives a polysiloxane which is bridged via organic quat groups and hence is highly viscous and has a quaternary nitrogen content of 0.17 mEquiv./g and a quat to epoxy groups ratio of 2.3.

Example 4

200 g of the epoxysiloxane from example 2, having an epoxy content of 0.251 mEquiv./g, are mixed with 1.60 g of bis(2-dimethylaminoethyl)ether and 1.8 g of acetic acid without further admixture of mono tertiary amine and heated to 80° C. The reaction mixture is only slightly cloudy and clarifies after 10 minutes, and after a further 4 hours free amine is no longer detectable. The highly viscous polysiloxane obtained is bridged via organic quat groups and has a quat to epoxy groups ratio of 0.66.

Comparative Example C1:

Example 1 is repeated with the same input materials, but with the change that all the epoxy groups of the siloxane are reacted with an excess of amine. Therefore, instead of 6.64 g it is now 14.88 g of the bifunctional tertiary amine and at 11.2 g, correspondingly more acetic acid is used. The batch is maintained at 80° C. for 3.5 hours, whereupon epoxy groups are no longer detectable. The free diamine content is 4600 ppm.

The highly viscous siloxane polymer comprises quaternary nitrogen in a concentration of 0.46 mEquiv./g and has a quat to epoxy groups ratio of above 1000.

Comparative Example C2:

Example 2 is repeated with the same input materials, but with the change that all the epoxy groups of the siloxane are reacted with a small excess of amine. The amount of dimethylbutylamine mixed in is therefore raised from 4.24 g to 5.60 g and that of the acetic acid from 3.8 to 4.5 g. The 5 hour ring opening process at 80° C. results in quantitative conversion of the epoxy groups and in an increased oil viscosity of 4260 $mm^2$/s (25° C.). The polymer obtained has a quaternary nitrogen concentration of 0.24 mEquiv./g and 2400 ppm of free dimethylbutylamine. The ratio of quat to epoxy groups is more than 1000.

Comparative Example C3:

Example 3 is in turn repeated with the same input materials, but with the change that the sum total of the amines is used in excess relative to the epoxy groups. While keeping the amount of bifunctional tertiary amine the same at 1.60 g, the amount of dimethylbutylamine used is raised from 1.52 to 3.55 g and that of the acetic acid from 3.2 to 5.0 g. After 5 hours at 80° C., epoxy groups are no longer detectable. The highly viscous oil, which is bridged via organic groups, comprises 2200 ppm of free dimethylbutylamine and a quat group concentration of 0.24 mEquiv./g. The ratio of quat to epoxy groups is more than 1000.

Use Examples

Microemulsion

The performance tests with respect to softness, hydrophobicity and also durability were carried out using cotton specimens finished by aqueous application. To this end, all example polymers were used to prepare microemulsions, the standard formulation of which comprises the following amounts of raw material:

66.8 g of siloxane polymer 10.0 g of butyldiglycol 22.2 g of isotridecyl ethoxylate (HLB value: 10.5)
2.0 g of Marlipal ST 1618
233.0 g of water.

The microemulsions each comprise 20.0% of active substance.

Padding with Examples 1-4 and Comparative Tests 1-3

The inventive and noninventive organopolysiloxanes comprising quaternary ammonium groups from examples 1 to 4 and comparative examples C1 to C3 were applied to textile sheet materials as follows:

A bleached, unfinished 100% CO cretonne knit having a basis weight of 230 $g/m^2$ and also an unfinished 100% CO terry fabric having a basis weight of 460 $g/m^2$ were used. A fabric padded with completely ion-free water and dried served as reference.

The fabric was in each case dipped into an aqueous liquor comprising 30 g of the recited microemulsion per liter. If necessary, the pH of the liquor was adjusted to 5 with acetic acid beforehand. The saturated fabric was squeezed off to a 70% wet pickup using a two-roll mangle, tentered and dried in a Mathis laboratory tenter at 150° C. for 5 minutes. The fabric was then conditioned at 23° C. and 60% relative humidity for at least 12 hours. The numbering of the finish examples is equal to the numbering of the preparation examples.

Example 5

Padding with a Combination of Compounds (A) and (B)

A bleached, unfinished 100% CO cretonne knit having a basis weight of 230 $g/m^2$ and also an unfinished 100% CO terry fabric having a basis weight of 460 $g/m^2$ were each dipped into an aqueous dilution of 1.93 g of Lupamin® 9095 (compound (A)), obtainable from BASF, and 998 g of completely ion-free water, the pH of these liquors having been adjusted to about 5 beforehand with acetic acid. Lupamin® 9095 is a 20% solution of a high molecular weight polyvinylamine (MW about 340 000 g/mol) in water. The saturated fabric was squeezed off to a 70% wet pickup using a two-roll mangle, tentered and dried in a Mathis laboratory tenter at 150° C. for 5 min.

This pretreated fabric was then dipped into an aqueous liquor comprising 30 g per liter of the inventive microemulsion (compound (B)), the preparation of which is described above in example 4. The saturated fabric was again squeezed off to a 70% wet pickup using a two-roll mangle, tentered and dried in a Mathis laboratory tenter at 150° C. for 5 min. The ratio on the textiles was accordingly 10:1 for amino groups from the pretreatment to epoxy groups from the finish. The fabric was then conditioned at 23° C. and 60% relative humidity for at least 12 hours.

Example 6

Padding with a Mixture of Compounds (A) and (B)

A liquor was prepared by mixing 1.93 g of Lupamin® 9095 (compound (A)), 30 g of the inventive microemulsion (compound (B)), the preparation of which is described above in example 4, and 968 g of completely ion-free water, and adjusted to about pH 5 with acetic acid. This mixture thus comprised a ratio of 10:1 for amino groups to epoxy groups.

A bleached, unfinished 100% CO cretonne knit having a basis weight of 230 $g/m^2$ and also an unfinished 100% CO terry fabric having a basis weight of 460 $g/m^2$ were each dipped into this liquor. The saturated fabric was squeezed off to a 70% wet pickup using a two-roll mangle, tentered and dried in a Mathis laboratory tenter at 150° C. for 5 min. The fabric was then conditioned at 23° C. and 60% relative humidity for at least 12 hours.

After conditioning, the finished fabrics—each finished with the inventive organopolysiloxanes (B) as per examples 1 to 4, with the combination and mixture, respectively, of the inventive compounds (A) and (B) as per examples 5 and 6 and with the noninventive compounds as per comparative tests 1 to 3—were subjected to determination of the droplet absorption time and of the softness comparison prior to washing.

To determine the fastnesses to washing, all finished textiles were washed together with about 3 kg of ballast material in a SIWAMAT 6143 domestic washing machine from Siemens using the coloreds program at 60° C. followed by spinning at 1400 rpm. In this case, 36 g of "Spee Feincolor" liquid laundry detergent from Henkel were used as wash surfactant. Altogether 2 wash cycles each 90 minutes in length were carried out without drying in between. The fabric was then dried and conditioned at 23° C. and 60% relative humidity for at least 12 hours. The fabric specimens were then resubjected to a softness comparison.

Determination of Softness (Hand Assessment)

Since the softness of textiles is greatly dependent on the subjective perception of the tester, only the boundary conditions can be standardized and not the assessment itself. To ensure reproducibility nonetheless, the finished specimens were assessed and ranked with regard to their softness. To this end, 10 testers awarded 1 to n points to n tested specimens, n points being awarded to the softest specimen and 1 point to the least soft specimen. The unfinished reference specimen was awarded 0 points. The hand assessment for any one specimen is accordingly the average value of points scored by this specimen.

Determination of Droplet Absorption Time

After finishing, the finished specimen was conditioned at 23° C. and 60% relative humidity for at least 12 hours before a droplet of deionized water was placed on the taut fabric surface from a height of 4 cm and the time taken for the droplet of water to become absorbed by the fabric was determined. Five determinations were carried out and the results averaged.

The table summarizes the results of the fabrics finished by means of the padding process.

TABLE 1

| | Examples | | | | | | | | | |
|---|---|---|---|---|---|---|---|---|---|---|
| | C1 | C2 | C3 | 1 | 2 | 3 | 4 | 5 | 6 | R |
| Droplet absorption time (s) of knit | 4 | 3 | 15 | 2 | 4 | 12 | 25 | 21 | 15 | <1 |
| Droplet absorption time (s) of terry | 7 | 2 | 9 | 3 | 3 | 8 | 8 | 12 | 11 | <1 |
| Hand of knit before washing | 1.2 | 1.8 | 2.6 | 4.6 | 4.8 | 6.5 | 6.5 | 8.7 | 8.3 | 0 |
| Hand of terry before | 1.5 | 1.6 | 2.3 | 4.7 | 5.3 | 6.7 | 5.9 | 8.6 | 8.4 | 0 |

TABLE 1-continued

| | Examples | | | | | | | | | |
|---|---|---|---|---|---|---|---|---|---|---|
| | C1 | C2 | C3 | 1 | 2 | 3 | 4 | 5 | 6 | R |
| washing | | | | | | | | | | |
| Hand of knit after washing | 1.7 | 1.9 | 3.9 | 3.8 | 4.0 | 6.6 | 6.1 | 8.5 | 8.5 | 0 |
| Hand of terry after washing | 2.0 | 2.1 | 3.4 | 3.7 | 4.5 | 6.9 | 5.4 | 8.7 | 8.3 | 0 |

In the table, C1-C3 represent the respective comparative tests, 1-6 represent the respective inventive examples and R represents the reference sample.

In the case of the knit and terry fabrics, softness is appreciably improved by the finish with the inventive organopolysiloxanes—in contrast to the finish as per the comparative tests—without water absorption being significantly impaired:

More particularly, improved softness is maintained after washing. Softness durability is particularly due to the combination of the inventive organopolysiloxanes (B) with the polyamine compounds (A)—as per examples and 6.

We claim:

1. Organopolysiloxanes containing quaternary ammonium groups, of the formula:

$$A_dR_{3-d}SiO(SiR_2O)_o(SiRAO)_pSiR_{3-d}A_d \quad (V)$$

where A is either E or Q, d is 0, o is 0 or an integer from 1 to 3000, and p is an integer from 2 to 100, where R is identical or different and is a monovalent, optionally halogenated hydrocarbyl radical having 1 to 18 carbon atoms, E is a monovalent SiC-bonded organic radical having 3 to 18 carbon atoms which contains an epoxy group, Q is a monovalent SiC-bonded organic radical in which a quaternary ammonium group is bonded to a silicon atom via a ring-opened epoxy group, with the proviso that the organopolysiloxanes each comprise at least one Q group and at least one E group and the Q/E ratio is on average in the range from 0.2 to 100.

2. The organopolysiloxanes of claim 1, wherein the Q/E ratio is from 0.5 to 20.

3. The organopolysiloxanes of claim 1, wherein the Q/E ratio is from 1 to 10.

4. The organopolysiloxanes of claim 1, wherein all R are methyl.

5. A process for preparing organopolysiloxanes containing quaternary ammonium groups of claim 1, comprising reacting epoxy-containing organopolysiloxanes (1) comprising units of the formula $$ER_bSiO_{(3-b)/2} \quad \text{(II) and}$$

$$R_cSiO_{(4-c)/2} \quad \text{(III),}$$

with tertiary amines (2) comprising at least one structural unit of the formula $$R^1_2N— \quad (IV)$$

where $R^1$ represents an alkyl group having 1 to 6 carbon atoms, in the presence of acids (3), with the proviso that the sum total of all structural units of formula (IV) is less than the sum total of all units of formula (II) and that the molar amount of the acids (3) which are used for neutralizing the reaction mixture is not less than the molar amount of basic structural units (IV) of the amines (2).

6. The process of claim 5, wherein the tertiary amines (2) are used in amounts of 0.15 to 0.99 mol of structural unit (N) per mole of epoxy group in organopolysiloxanes (1).

7. A formulation comprising (A) at least one polyamino compound comprising two or more amino groups, and (B) at least one organopolysiloxane comprising quaternary ammonium groups of claim 1.

8. A formulation comprising (A) at least one polyamino compound comprising two or more amino groups, and (B) at least one organopolysiloxane comprising quaternary ammonium groups prepared by the process of claim 5.

9. The formulation of claim 7, wherein compounds (A) and (B) are used in the form of aqueous solutions or aqueous emulsions.

10. A process for treatment of a fibrous substrate with a formulation of claim 7, comprising preparing mixtures of compounds (A) and (B) prior to the treatment, and treating the fibrous substrate with the mixture.

11. A process for treatment of a fibrous substrate with a formulation of claim 7, wherein the treatment is effected first with compound(s) (A) and then subsequently treatment with compound(s) (B).

12. The process of claim 7, wherein compound(s) (A) are used in amounts of 0.1 to 10 mol of amino group, based on 1 mol of epoxy groups in compound(s) (B).

13. A fabric treating composition, comprising an organopolysiloxane component consisting of one or more organopolysiloxanes containing quaternary ammonium groups, of the formula:

$$A_dR_{3-d}SiO(SiR_2O)_o(SiRAO)_pSiR_{3-d}A_d \quad (V)$$

where A is either E or Q, d is 0, o is 0 or an integer from 1 to 3000, and p is an integer from 2 to 100, where R is identical or different and is a monovalent, optionally halogenated hydrocarbyl radical having 1 to 18 carbon atoms, E is a monovalent SiC-bonded organic radical having 3 to 18 carbon atoms which contains an epoxy group, Q is a monovalent SiC-bonded organic radical in which a quaternary ammonium group is bonded to a silicon atom via a ring-opened epoxy group, with the proviso that the organopolysiloxanes each comprise at least one Q group and at least one E group and the Q/E ratio is on average in the range from 0.2 to 100.

14. The formulation of claim 7, wherein the polyamino compound is selected from the group consisting of silicon-free organic polyamino compounds.

15. The formulation of claim 7, wherein the polyamino compound is selected from the group consisting of polyamino compounds containing two or more primary amino groups.

16. The formulation of claim 7, wherein the polyamino compounds contain from 10 to 1000 primary amino groups.

17. The formulation of claim 7, wherein the polyamino compound is one or more compounds selected from the group consisting of partially and fully hydrolyzed polymers of vinylformamide and polymers of ethyleneimine.

* * * * *

UNITED STATES PATENT AND TRADEMARK OFFICE
CERTIFICATE OF CORRECTION

PATENT NO. : 8,080,625 B2
APPLICATION NO. : 12/743949
DATED : December 20, 2011
INVENTOR(S) : Christian Herzig et al.

It is certified that error appears in the above-identified patent and that said Letters Patent is hereby corrected as shown below:

Column 12, Line 6, Claim 6:

After "of structural unit" delete "(N)" and insert -- (IV) --

Signed and Sealed this
Twentieth Day of March, 2012

David J. Kappos
*Director of the United States Patent and Trademark Office*